(12) United States Patent
Xu

(10) Patent No.: US 8,958,924 B2
(45) Date of Patent: Feb. 17, 2015

(54) NETWORKED SOLAR PANELS AND RELATED METHODS

(76) Inventor: Fang Xu, San Diego, CA (US)

(*) Notice: Subject to any disclaimer, the term of this patent is extended or adjusted under 35 U.S.C. 154(b) by 353 days.

(21) Appl. No.: 13/198,076

(22) Filed: Aug. 4, 2011

(65) Prior Publication Data

US 2013/0035801 A1 Feb. 7, 2013

(51) Int. Cl.
| | | |
|---|---|---|
| G06F 1/26 | (2006.01) | |
| H02J 7/34 | (2006.01) | |
| H02J 3/38 | (2006.01) | |
| H02J 7/35 | (2006.01) | |

(52) U.S. Cl.
CPC ............... *H02J 7/345* (2013.01); *H02J 3/383* (2013.01); *H02J 7/35* (2013.01); *H02J 7/355* (2013.01); *Y02E 10/563* (2013.01); *Y02E 10/566* (2013.01)
USPC ............ 700/297; 700/286; 136/243; 136/244

(58) Field of Classification Search
USPC .......................... 700/297; 136/206, 243, 244
See application file for complete search history.

(56) References Cited

U.S. PATENT DOCUMENTS

| 2006/0103346 A1* | 5/2006 | Misu et al. ............. 320/107 |
| 2010/0008119 A1* | 1/2010 | O'Brien et al. ......... 363/132 |
| 2012/0286574 A1* | 11/2012 | Sawada et al. ......... 307/23 |

OTHER PUBLICATIONS

Chiasserini et al., "Energy Efficient Battery Management" IEEE Journal on Selected Areas in Communication vol. 19, No. 17, Jul. 2001. pp. 1235-1245.*

* cited by examiner

*Primary Examiner* — Mohammad Ali
*Assistant Examiner* — Emilio J Saavedra
(74) *Attorney, Agent, or Firm* — Johhn K. Buche; Buche & Associates, P.C.

(57) ABSTRACT

Disclosed is a system of networked PV panels, wherein each panel is coupled to a small capacity battery capable of storing electricity produced by the panels, wherein each battery is configured to randomly and isolatedly discharge its stored electricity into the power grid at a time before the battery reaches its capacity.

5 Claims, 2 Drawing Sheets

NETWORKED SOLAR PANELS AND RELATED METHODS

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

1. Field of Invention

This invention relates to the field of providing electricity to a power grid, particularly whenever the electricity is generated via solar panels (e.g., photovoltaic electricity generation).

2. Background

Electricity may be generated in many ways. Frequently, electricity is generated via converting mechanical energy or solar energy into electrical energy.

Known methods for converting mechanical energy into electrical energy have not been entirely satisfactory for electricity generation and storage. For example, using the mechanical energy resulting from high pressure steam to generate electricity via a reciprocating or steam engine is unsatisfactory since (1) the production of high pressure steam requires heat from combusting fossil fuels or nuclear fission and (2) such heat production methods have deleterious effects on earth's environment (e.g., carbon emissions from combusting fossil fuels may contribute to global warming and nuclear waste resulting from nuclear fission can render geographical areas uninhabitable due to radioactivity). For another example, using the mechanical energy of moving fluids (e.g., wind and flowing or falling water) to turn the turbine of a generator is unsatisfactory since, among other things, (1) natural winds and water flows are unpredictable and (2) unnatural falling water frequently requires the building of a damn which can be expensive and damaging to the natural environments surrounding the damn. The unsatisfactory aspects of converting mechanical energy into electrical energy have resulted in a focus on electrical energy generation from solar energy, which is considered one of most environmentally friendly and safest energy sources. See, e.g., the country of Germany which has announced that it will completely abandon nuclear energy by 2022 in view of the 2011 Fukushima Daiichi Nuclear Power Plant meltdown in Japan; see also the California Public Utilities and Federal Energy Regulatory Commissions which estimate that solar energy could be used to make 3000 MW (MegaWatts) of electrical power in California by the year 2016 (i.e., about 6 percent of the electrical power the state has ever used in one time, which was 50,000 MW back in 2006).

One way to convert solar energy into electrical energy is via photovoltaics (PV). Typically, photovoltaics may be accomplished by exposing at least one panel of semi conductors that exhibit the photovoltaic (PV) effect to sunlight to produce direct current electricity. Often, the electricity produced by distributed pluralities or arrays of PV panels is combined and provided to the public power grid (i.e., electricity network). Although useful for producing electricity, photovoltaics have not yet been entirely satisfactory for converting solar energy into electrical energy for a variety of reasons.

One problem with photovoltaics is that the amount of electrical energy generated by each one of the PV panels in a distributed plurality or array of PV panels depends on uncertain environmental factors (e.g., weather) which can cause undesirable fluctuations in the voltage of the power grid (voltage fluctuations unfavorably affect the deliverability of grid loads and overall managability of the power grid). For example, the electrical production of a plurality of PV panels under moving clouds can change from very little to very large amounts in a short time period, which change will correspondingly cause a voltage fluctuation in the associated power grid. The identified voltage fluctuation problem is exacerbated by the uncertainty of draws on the electrical energy within the power grid, for instance, whenever high power consumption by households accessing the grid coincides with low power production from the PV panels or whenever low power consumption coincides with high power production. Accordingly, there is a need for systems and methods of converting solar energy into electrical energy without resulting in unfavorable voltage fluctuations in the power grid.

One attempt to reduce voltage fluctuations in the power grid is embodied by the advanced metering infrastructure (AMI) employed by the Sacramento Municipal Utility District (SMUD) in California. The AMI is a control system that predicts draws on the grid based on historical electricity consumption and power generation. With reference to photovoltaics, the AMI is suited for reducing the exacerbating effects of uncertain energy draws on the grid but the AMI does nothing to combat the environmental and other uncertainties associated with photovoltaic production of electrical energy. Accordingly, a need remains for systems and methods of converting solar energy into electrical energy without resulting in unfavorable voltage fluctuations in the power grid.

Another attempt to reduce voltage fluctuations in the power grid caused by photovoltaic production of electrical energy is numerical simulation. See U.S. Dept. of Energy, High Penetration Solar Forum, "Planning & Modeling for High penetration Solar" and "Solar Variability, Forecasting, and Modeling Tools." Numerical simulation uses historical data to predict electrical energy inputs to the power grid (electrical energy sources may include a plurality or array of PV panels). While better than nothing, this approach cannot accurately account for environmental and other uncertainties associated with photovoltaic production of electrical energy.

Yet still, another attempt to reduce voltage fluctuations in the power grid caused by photovoltaic production of electrical energy is battery storage (see, e.g., U.S. Pub. Pat. App. No. 2003/0047209 (published Mar. 13, 2003). Known battery storage techniques sometimes involve storing all the electricity produced by a plurality or array of PV panels in a high capacity or long term battery so that the electrical energy may be provided to the grid at a known rate. Although effective at reducing voltage fluctuations in the grid, this approach is unsatisfactory since high capacity or long term batteries are expensive and have low transmission efficiency. Thus, a need still exists for systems and methods of converting solar energy into electrical energy without high capacity or long term battery storage and without resulting in unfavorable voltage fluctuations in the power grid.

SUMMARY OF THE INVENTION

In view of the foregoing, it is an object of this application to disclose systems and methods of photovoltaicly producing electricity without the need for high capacity or long batteries and without resulting in unfavorable voltage fluctuations in the power grid.

To meet this objective, disclosed is a system of networked PV panels, wherein each panel is coupled to a small capacity battery capable of storing electricity produced by the panels, wherein each battery is configured to randomly and isolatedly (relative to other batteries coupled to the other panels) discharge its stored electricity into the power grid at a time before the battery reaches its capacity (preferably every approximately zero to thirty minutes). Within said system, the randomized and delayed discharge of electricity may reduce voltage fluctuations when compared with other systems since (1) each panel only isolatedly contributes a small amount of electricity relative to the inherent electricity load of the grid so that the associated voltage fluctuation may be nominal or otherwise easy to manage, (2) the delayed discharge provides an opportunity for data to be collected so that the load of the power grid can be managed for the associated influx of electricity (like, e.g., in a feed-forward controlled system), and (3) the randomized discharge of electricity disrupts weather effects (e.g., the sudden drop in electricity generation of a solar panel may not be displayed by all affected solar panels simultaneously so that the system can accommodate and adapt to the change more easily). Panels/Batteries within the system may communicate (i.e., be networked) with each other or a controller wirelessly or with wires to accomplish the isolated and delayed discharge, including the communication of energy production information (e.g.: AC and DC size of the system and each panel/battery; temperatures of the system (including temperatures of the panels and batteries); current AC production by the system and panels; time stamps of the data; battery input from the associated panels and outputs to the power grid; battery charge percentage).

To meet this objective, the disclosed system may be distributed pluralities of solar panels, wherein each plurality of solar panels is coupled to a small capacity battery capable of storing electricity produced by the plurality of panels, wherein each battery is configured to randomly and isolatedly (relative to the other distributed pluralities of panels) discharge its stored electricity into the power grid at a time before the battery reaches its capacity (preferably every approximately zero to thirty minutes). Said distributed pluralities of panels and their respective batteries within the system may communicate (i.e., be networked) with each other or a controller wirelessly or with wires to accomplish the isolated and delayed discharge, including the communication of energy production information.

BRIEF DESCRIPTION OF THE FIGURES

The manner in which these objectives and other desirable characteristics can be obtained is better explained in the following description and attached figures in which.

It is to be noted, however, that the appended figures illustrate only typical embodiments disclosed in this application, and therefore, are not to be considered limiting of its scope, for the invention may admit to other equally effective embodiments that will be appreciated by those reasonably skilled in the relevant arts.

DETAILED DESCRIPTION OF PREFERRED EMBODIMENTS

Disclosed is a preferable embodiment of a system of networked PV panels. The preferred system may comprise: a plurality of PV panels; a small capacity battery coupled to each panel(s); a control system module; and, a network access module. Within the disclosed system, each battery is small capacity so that it suitably features an electricity storage capacity equal to the amount of electricity produced by the panel to which it is coupled for a fixed period of time (e.g., after twenty to thirty minutes) at the panel's highest possible production rate. Preferably, the control system module is configured to control the system so that each battery randomly and isolatedly (relative to other batteries coupled to the other panels) outputs its stored electricity into the power grid anytime before or as the battery achieves its full electricity storage capacity (e.g., within said fixed period of time (every approximately zero to thirty minutes)). The network access module is configured to gather information about the system and communicate said information to an offsite controller of the power grid so that the grid may be managed to accommodate the random electrical outputs of the battery. The more specific aspects of the system are further disclosed herein.

The PV panels and small capacity batteries may be of any kind or variety known to those of skill in the art or like technologies now or yet known for the production and short-term storage of electricity. Those of skill in the art will further know the manner by which the panels and batteries may be coupled in order to (1) allow electricity produced by the panels to be input into the batteries and (2) allow electricity stored by the batteries to be controllably input into the power grid. By way of example, the system may be a DER (distributed electric resource) defined by IEE1547 so that the system can conform to existing standards in order to interconnect its electrical power to the power grid). It should also be appreciated that the battery can serve as a power regulator to improve electrical power fed to the power grid.

Figure 1:
FIG. 1 is an exemplary logic flow for a preferable operation of a preferred control system module.

The control system module suitably may comprise programming code on a computer readable memory that is coupled to the batteries of the system. Suitably, the module is configured to accomplish the preferably randomized, isolated, and delayed output of electricity stored in individual batteries into the power grid. FIG. 1 represents a typical logic flow chart for said configuration. Referring to that figure the logic may be recited: If a battery within the system is at full capacity, THEN output the battery's electricity to the grid, ELSE for every battery, at a randomized timing prior to the battering achieving full capacity (e.g., within thirty minutes of the battery's most recent output of electricity to the power grid), IF no other battery in the system is concurrently outputting electricity to the grid, THEN output the battery's electricity to the power grid, ELSE restart from the beginning of the logic. As noted above, within said system, the randomized and delayed discharge of electricity may reduce voltage fluctuations when compared with other systems since (1) each panel only isolatedly contributes a small amount of electricity relative to the inherent load of the grid so that the associated voltage fluctuation may be nominal and (2) the delayed discharge provides an opportunity for data to be collected so that the load of the power grid can be managed for the influx of electricity (like, e.g., in a feed-forward controlled system). It should be noted that in an alternate or the same embodiment, the control system module could be configured for manual override so that the electricity stored in the batteries may be output to the power grid at once or one at a time without reliance on the above or similar logic.

The network access module suitably may comprise programming code on a computer readable memory that is coupled to the system and at least one communication device (e.g., WiFi (802.11a/b/g/n) or cellular wireless technology (GSM/UMTS/HSPA/LTE and/or CDMA/EVDO). Preferably, the network access module is configured to periodically gather and communicate via the communication device status information of the system to a controller of the power grid. Such status information may include, but should not be limited to: AC and DC size of the system and each panel/battery; temperatures of the system (including temperatures of the panels and batteries); current AC production by the system and panels; time stamps of the data; battery input from the associated panels and outputs to the power grid; battery charge percentage; and geographical information. For communication purposes, the network module and associated components preferably conform to 802.11, 3GPP or 3GPP2 standards, as well as carrier requirements. The status of the system may be analyzed by the controller of the power grid, including any grid management systems to assist in the planning and distribution of the electricity output by the batteries into the power grid. It should be noted that the control module and network access module may be integrated so that the discharge timing may be controlled by a centralized controller through the network access module.

In this or another preferable embodiment the network access module may be defined by or integrated with a smart meter. Many smart meters already communicate wirelessly with a utility company so that the disclosed networked solar panel system may comprise a battery, a solar panel, the control system module (including circuitry and algorithm to control the delayed release of energy into the power grid system), and the network access module integrated with the smart meter (in order to collect and report the status of the solar panel system to the power grid control system via the smart meter). Integrating the disclosed solar panel system with a smart meter relies on the standardization of the communication protocols between the smart meter and its peripherals. Alternatively, non-smart meters may be retrofitted with a network access module to effectively create a smart meter.

Another preferable embodiment may be a system of distributed pluralities of PV panels. The system may comprise: more than one plurality of PV panels; a small capacity battery coupled to each plurality of panels; a control system module; and, a network access module. Within the presently disclosed system, each battery is small capacity so that it suitably features an electricity storage capacity equal to the amount of electricity produced by the plurality of panels to which it is coupled for a fixed period of time (e.g., after twenty to thirty minutes) at the plurality of panels' highest possible production rate. Preferably, the control system module of this embodiment is configured to control the system so that each battery randomly and isolatedly (relative to other batteries coupled to the other pluralities of panels) outputs its stored electricity into the power grid anytime before or as the battery achieves its full electricity storage capacity (e.g., every approximately zero to thirty minutes). The network access module of this embodiment is preferably configured to gather information about the system and communicate said information to an offsite controller of the power grid so that the grid may be managed to accommodate the random electrical outputs of the battery. This embodiment is analogous to the earlier described embodiment, the difference being that a plurality of solar panels is coupled to each battery instead of a single solar panel.

The present embodiment is particularly useful for existing distributed solar panel systems. In one non-limiting example, residential and commercial structures that are distributed throughout a geographic region may be provided with a plurality of solar panels. The distributed pluralities of solar panels may be coupled to batteries (one battery per distributed plurality) and provided with an integrated control module network access module (one per distributed plurality). Continuing the example, the battery(ies) of each structure may be randomly discharged into the power grid in the manner disclosed above.

Figure 2:
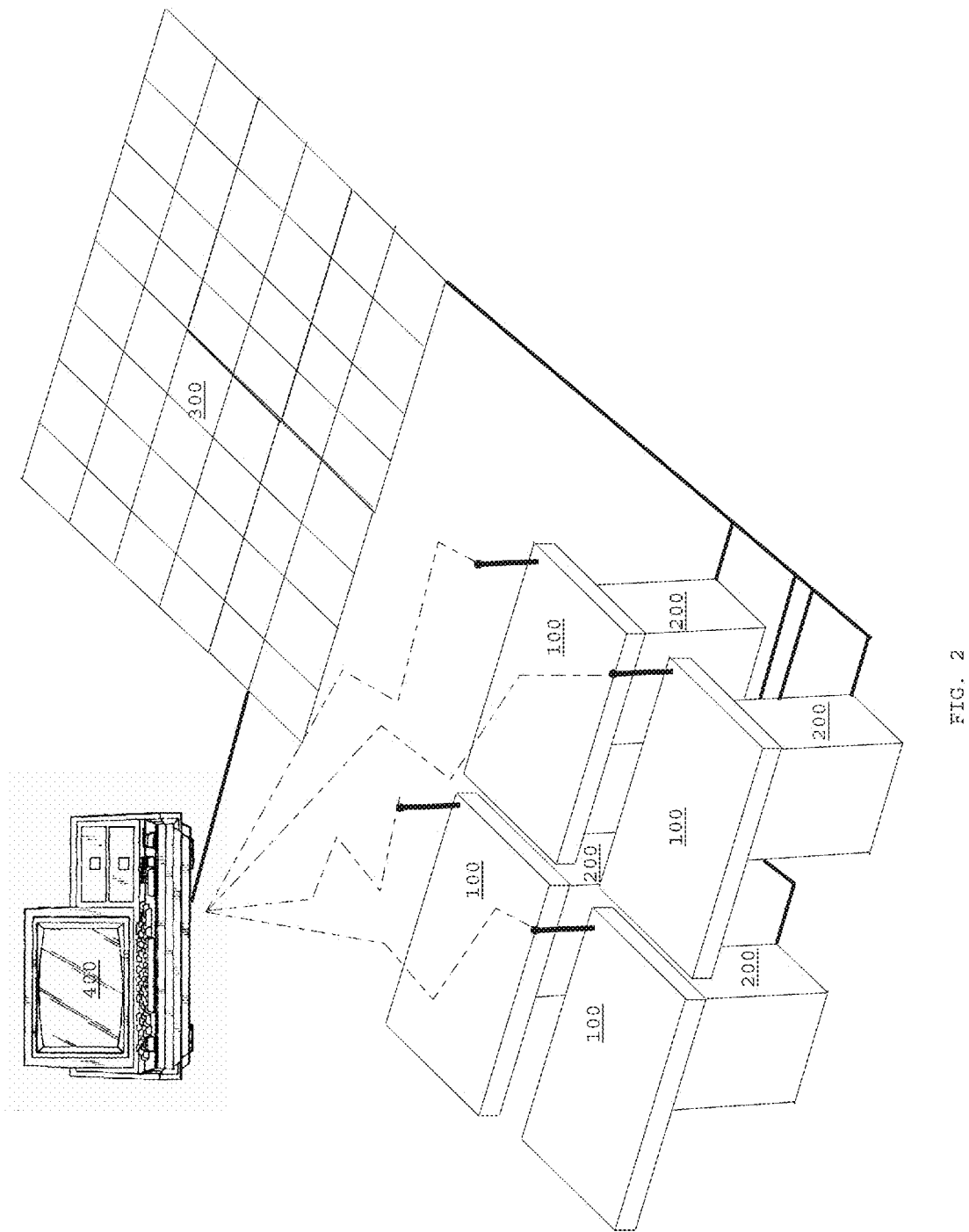
FIG. 2 is an exemplary depiction of the disclosed system.

FIG. 2 depicts a preferred embodiment of a networked solar panel system. As depicted, the system comprises system of solar panels 100 and batteries 200 operating under a control module to randomly provide electricity to the power grid 300 while the communication module transmits data (or control module commands) to the main power grid control 400. In the figure, the solar panels 100 may represent a single solar panel or a plurality of solar panels.

Moreover, it should be apparent that further numerous structural modifications and adaptations may be resorted to without departing from the scope and fair meaning of the present invention as set forth hereinabove and as described herein below by the claims.

I claim:

1. A method of delivering electricity to a power grid, the method comprising the steps of:

generating electricity via a network of more than one photovoltaic (PV) panel that are each coupled to a respective battery with a storage capacity, wherein each battery is configured to receive electricity from the associated PV panel to achieve full storage capacity after a pre-determined time of said associated PV panel generating electricity;

storing the electricity generated by each of said PV panels in each of the respective batteries when one or more of said batteries achieve said full storage capacity, identifying said one or more battery at full storage capacity and outputting the electricity of said one or more battery to the power grid while retaining the electricity stored in the batteries that did not reach said full storage capacity;

when none of said batteries are at said full storage capacity, (a) randomly selecting a time that is less than said predetermined time, (b) randomly selecting one of said batteries, and (c) outputting the electricity stored in the randomly selected battery to the power grid while retaining the electricity stored in the batteries that were not selected.

2. The method of claim 1 further comprising the steps of:

reporting status information of the system of PV panels to a centralized control system; and, using the collected information to control the timing of electricity output from the said batteries.

3. A system comprising:

a first solar panel;

a first battery coupled to said first solar panel and for storing electricity produced by said first solar panel;

a second solar panel;

a second battery coupled to said second solar panel and for storing electricity produced by said second solar panel;

said first and second batteries each having a storage capacity, wherein electricity sufficient to fill said storage capacity is provided to said batteries after a predetermined time, and wherein electricity that is not sufficient to fill said storage capacity is provided to said batteries after a charge time that is less than said predetermined time; and, a computer readable memory with programming code coupled to computer hardware for controlling output of electricity stored in the first and second batteries, the programming code configured so that the electricity in the first and second batteries may be randomly discharged at different times by discharging the first or second batteries, one-at-a-time, whenever either battery is at full storage capacity, and
whenever neither battery is at full storage capacity, 1) randomly selecting the first or second battery, 2) randomly selecting a time between said charge time and said pre-determined time and, 3) discharging the electricity of the randomly selected battery at said randomly selected time while retaining the electricity of the other battery.

4. The system of claim 3 further comprising a power grid that interfaces with discharged electricity from said first and second batteries.

5. A network of solar panels comprising:
a first battery coupled to a first solar panel;
a second battery coupled to a second solar panel;
said first and second batteries having a storage capacity, wherein electricity sufficient to fill said storage capacity is provided to said batteries after a predetermined time, and wherein electricity that is not sufficient to fill said storage capacity is provided to said batteries after a charge time that is less than said predetermined time;
and, programming code on computer readable memory coupled to computer hardware for controlling electrical output of the first and second batteries, the programming code configured so that any electricity in the first and second batteries is randomly output by
discharging the first or second batteries, one-at-a-time, whenever either battery is at full storage capacity, and
whenever neither battery is at full storage capacity, 1) randomly selecting the first or second battery, 2) randomly selecting a time between said charge time and said pre-determined time and, 3) discharging the electricity of the randomly selected battery at said randomly selected time while retaining the electricity of the other battery.

\* \* \* \* \*